May 1, 1962     F. GRIGONIS     3,032,218
TRAILER

Filed Jan. 2, 1959     3 Sheets-Sheet 1

*INVENTOR.*
FRANK GRIGONIS
BY Woodling & Krost
ATTORNEYS

May 1, 1962　　　　　F. GRIGONIS　　　　3,032,218
TRAILER

Filed Jan. 2, 1959　　　　　　　　　　　3 Sheets-Sheet 2

INVENTOR.
FRANK GRIGONIS
BY Woodling & Krost
ATTORNEYS

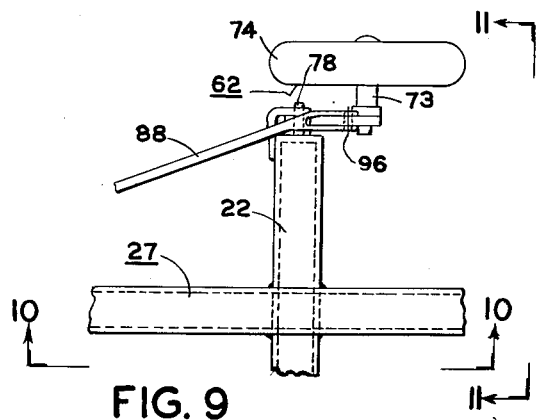
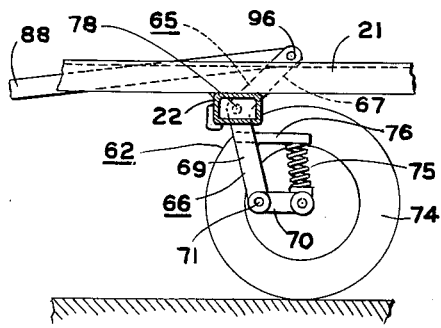
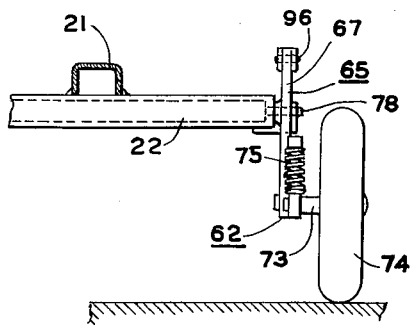
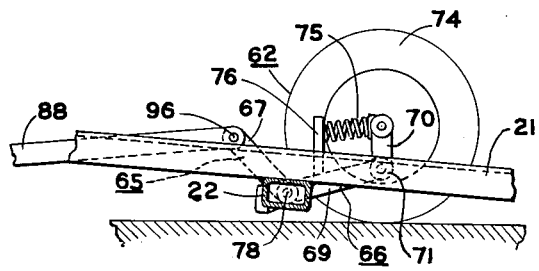

United States Patent Office 3,032,218
Patented May 1, 1962

3,032,218
TRAILER
Frank Grigonis, Cleveland, Ohio, assignor to
Camel Trailers Incorporated
Filed Jan. 2, 1959, Ser. No. 784,478
5 Claims. (Cl. 214—505)

The invention relates in general to trailers and more particularly to boat trailers wherein substantially the entire length of the same are capable of being lowered to a position very close to the ground.

An object of the invention is to provide a trailer having a load carrying frame wherein substantially the entire length may be lowered to a position substantially on the ground.

Another object of the invention is to provide a trailer wherein one may selectively lower only the rear of the same or may lower substantially the entire length of the same.

Another object of the invention is to provide a trailer having wheels mounted by a member which member is in turn pivotally connected to a frame, with power and linkage means whereby the wheels and frame may be raised and lowered relative to each other.

Another object of the invention is to provide a trailer having a frame divided into front and rear portions by a hinge or pivot whereby the hinged portion may be lowered, and wheels swingably mounted on the rear portion of the frame whereby the rear portion may be lowered.

Other objects and a fuller understanding of this invention may be had by referring to the following description and claims, taken in conjunction with the accompanying drawings, in which:

FIGURE 9 is a fragmentary plan view showing the mounting of one of the trailer wheels;

FIGURE 10 is a view taken generally along the line 10—10 of FIGURE 9;

FIGURE 11 is a view taken generally along the line 11—11 of FIGURE 9; and

FIGURE 12 is a view similar to FIGURE 10 however showing the rear of the trailer in its lower position.

Figure 1:
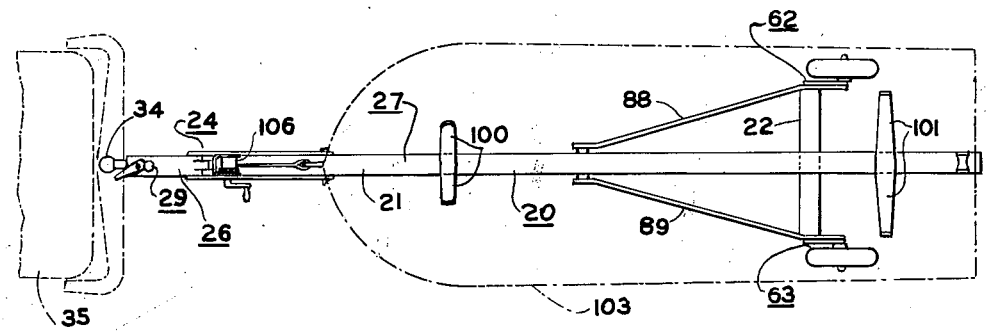
FIGURE 1 is a plan view of a trailer constructed in accordance with the teachings of the present invention and showing the position of a boat in dot-dash lines.
Figure 2:
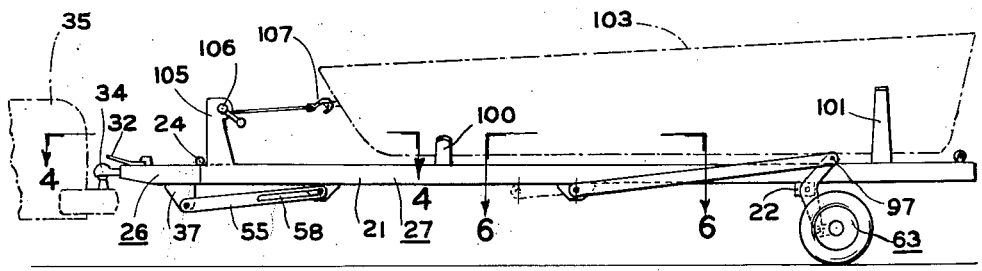
FIGURE 2 is a side elevational view of the trailer shown in FIGURE 1.
Figure 3:
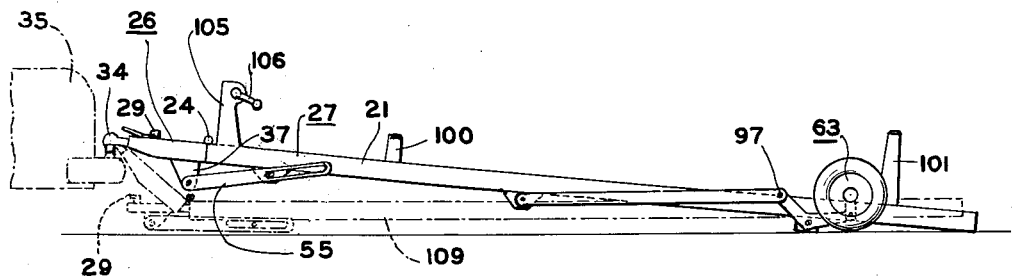
FIGURE 3 is a view similar to FIGURE 2 and showing the rear of the trailer lowered in full lines and showing in dot-dash lines how the front of the trailer may be lowered.
Figure 7:
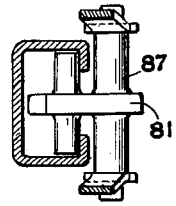
FIGURE 7 is a view taken generally along the line 7—7 of FIGURE 6.
Figure 8:
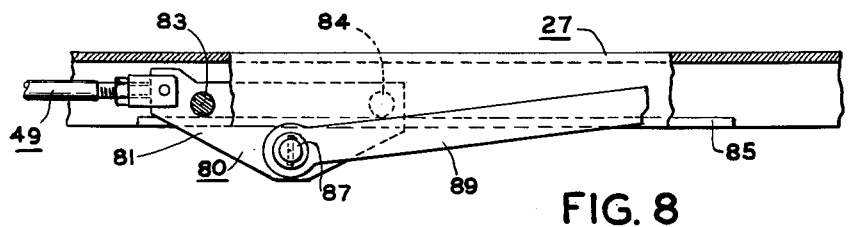
FIGURE 8 is a view taken generally along the line 8—8 of FIGURE 6.

Referring generally to FIGURES 1, 2, and 3, the construction of the boat trailer illustrated herein includes in combination a generally T-shaped frame 20 having a longitudinal frame member 21 and a transverse frame member 22. The longitudinal frame member 21 is generally of a channel-shaped construction (FIGURE 7) with the open end of the channel facing the ground whereas the transverse frame member is of a closed box type construction (FIGURE 10). As seen in FIGURES 1–3, the trailer constructed in accordance with the teachings of the present invention enables a user to selectively lower either the rear or both the front and rear of the same.

Figure 4:
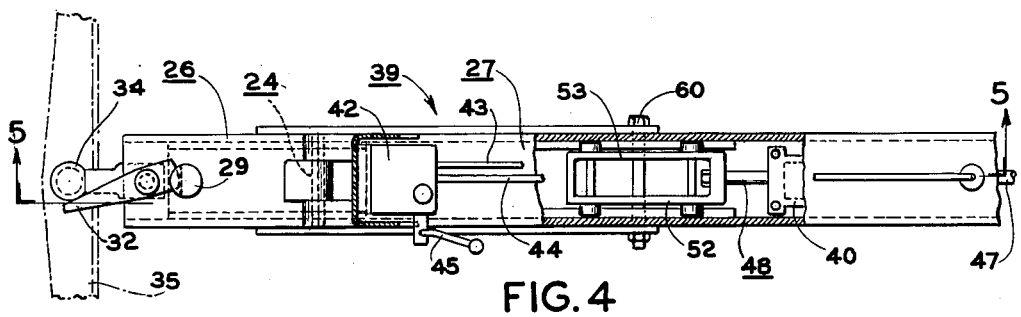
FIGURE 4 is a view taken generally along the line 4—4 of FIGURE 2 and showing some of the parts broken away.
Figure 5:
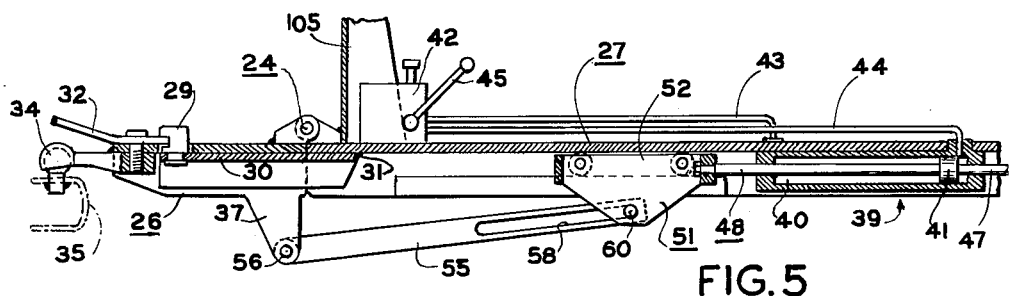
FIGURE 5 is a view taken generally along the line 5—5 of FIGURE 4.
Figure 6:
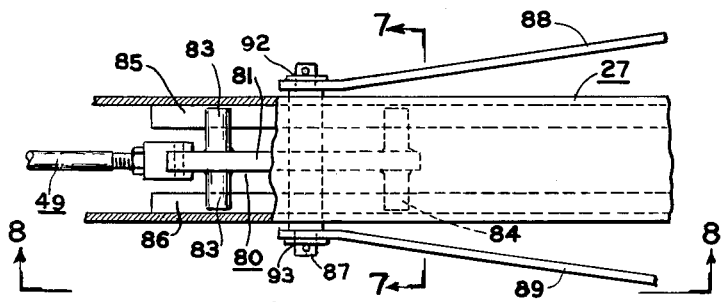
FIGURE 6 is a view taken generally along the line 6—6 of FIGURE 2.

FIGURES 4–12 illustrate in more detail the construction which enables this desired result to be brought about. Hinge or pivot means 24 serve to divide the longitudinal frame member 21 into front and rear portions 26 and 27, respectively. A latch mechanism is provided between the aforementioned front and rear portions and this latch mechanism is for the purpose of selectively permitting and prohibiting movement of the portions about the hinge means as shown in FIGURE 3. The latch mechanism includes a latchable member 29 which is fixedly secured to a plate 30 which is in turn welded to the rear portion 27 as at 31. Pivotally mounted on the front portion 26 is a latch member 32 and when the latch and latchable members 32 and 29 respectively are in engagement with each other as shown in FIGURES 4 and 5, the front and rear portions of the longitudinal frame member are prevented from angular movement relative to each other. A hitch 34 is provided on the front portion 26 of the longitudinal frame member and is for the purpose of securing the frame to a vehicle 35. Fixedly secured to the front portion of the frame by any suitable means is an arm 37 and this arm extends downwardly from the front portion as best seen in FIGURES 2, 3, and 5. Power means 39 are carried by the frame on the rear portion 27 just behind the hinge means 24. The power means illustrated includes a hydraulic cylinder 40 within which is adapted to travel a piston 41. A hydraulic pump 42 is also provided and hydraulic conduits 43 and 44 respectively, extend to either side of the piston 41. A handle 45 is provided for the purpose of providing hydraulic fluid under pressure to either side of the piston depending upon whether raising or lowering movement of the trailer is desired. Although this type of power means has been illustrated, it should be readily recognized by those skilled in the art that many types of power mechanisms might be utilized. For example, a geared jack, pneumatic jack, electric drive, or any other mechanism available on the market may be utilized to provide the power for the purposes described hereinafter. A drive member 47 is provided and extends within the longitudinal frame member and is provided with first and second or front and rear portions 48 and 49, respectively. The front portion 48 of the drive member is secured to a carriage 51 which includes first and second side plates 52 and 53, respectively. A connecting link 55 is connected at a first end portion by pivot means 56 to the arm 37 which extends from the front portion of the longitudinal frame member 21. The other or second end portion of the connecting link 55 is provided with a slot 58 and the carriage 51 is provided with a lost motion connection to the connecting link 55 by means of a bolt or rod 60 which extends through the slot 58 and between the side plates 52 and 53, respectively. The connection between the carriage 51 or front end portion of the drive member 47 and the connecting link 55 may be referred to as a sliding pivotal connection.

The transverse frame member 22 is provided with first and second end portions and to the respective end portions of this member are swingably secured first and second wheel assemblies 62 and 63, respectively. Since the construction of each of the wheel assemblies is basically the same, details of construction of only one will be described herein (FIGURES 9–12). Each of the wheel assemblies includes a lever member 65 which includes first and second end portions 66 and 67 respectively. The first end portion of the lever member 65 includes first and second members 69 and 70 respectively, pivotally connected together as at 71. An axle 73 is journalled by the second member 70 away from the pivotal connection 71 and a wheel 74 is in turn carried by the axle. A spring 75 extends between the axle 73 and a member 76 which is fixedly secured to the first member 69 by any suitable means, for example, welding. Pivot means 78 serve to connect the lever members intermediate the first and second end portions above referred to, to the respective end portions of the transverse member.

The second end portion of the drive member 47 is connected to a second carriage 80 which includes a plate 81 with bearing members 83 and 84 respectively, extending transversely therethrough and slidably travelling upon flanges 85 and 86, respectively. A pin 87 extends transversely through the plate 81 and is adapted to travel with the carriage 80. First and second drive links 88 and 89 respectively are pivotally connected at one end portion thereof to opposite ends of the pin 87 as at 92 and 93 respectively. The other end portion of the first and second drive links are pivotally connected to the second end portion of the lever members 65 of the first and second wheel assemblies as indicated at 96 and 97, respectively.

The frame of the trailer is also provided with first and second pairs of vertical support members 100 and 101 respectively, for the purpose of engaging opposed sides of a boat 103 to help steady the same upon the trailer. A vertically extending post 105 is also provided on the frame near the hinged connection 24 and supports a hand winch 106 which serves by means of a hook 107 to secure the front end portion of the boat. The trailer may of course also be provided with rollers or equivalent means for aiding an operator in getting the boat onto the trailer.

In operation let it be assumed that it is desired to load a boat onto the trailer shown herein. If the depth of water which the boat is in and the terrain is such that only the rear of the trailer need be lowered in order to get the boat onto the same, it is necessary only to leave the latch mechanism between the front and rear frame portions 26 and 27 in latched condition and to move the drive member 47 forward toward the vehicle 35. This is accomplished in the instant embodiment by releasing hydraulic pressure on the front side of the piston 41 through conduit 43 back to the pump 42. If need be, hydraulic fluid may be introduced onto the rear side of the piston, however in lowering the rear portion of the trailer this is accomplished by means of the weight of the trailer itself. Forward movement of the drive member causes the lever members of the wheel assemblies to travel from the position shown in FIGURE 2 to the position shown in FIGURE 3 whereat the rear of the longitudinal frame member engages the ground. The sliding pivotal connection between the front end portion of the drive member and the arm on the front frame portion 26 assumes the position which is shown in FIGURE 3. The sliding pivotal connection therefore allows relative lost motion movement between the connecting link 55 and the slot and rod 58 and 60. When the boat has been brought into position over the trailer then the rear end portion is raised from the position of FIGURE 3 to the position of FIGURE 2 by applying hydraulic fluid under pressure to the front side of the piston 41 from the pump 42 at which time the drive member travels rearwardly. The rearward movement of the drive member is transmitted through the drive links 88 and 89 to the second end portion of the lever members 65. This causes the wheels to travel about the pivot means 78 in a clockwise direction as viewed in FIGURE 3. This causes the rear of the frame to be raised into a position whereby the trailer may be transported.

If it had been desired to lower the entire length of the trailer frame to the position shown in the dot-dash lines 109 in FIGURE 3, then in addition to the steps taken hereinabove it would also have been necessary to release the latch mechanism from the position shown in FIGURES 4 and 5 by moving the latch member 32 about its pivotal mounting out of engagement with the latchable member 29. With this accomplished, forward movement of the drive member permits the front and rear portions 26 and 27 to move relative to each other about the hinge or pivot means 24 into the dot-dash position shown in FIGURE 3. This positions the entire length of the frame substantially flat on the ground. After the boat is suitably positioned over the trailer then it is only necessary to move the drive member in a rearwardly direction at which time the rear of the trailer is raised relative to the wheels and the connection between the drive member and the front frame portion 26 by means of the connecting link 55 causes the front and rear portions of the frame to again assume the position of FIGURE 2. When this is accomplished the latch mechanism between the front and rear frame portions is again engaged by means of moving the latch member 32 into engagement with the latchable member 29. It will also be appreciated that a safety latch may be utilized with the construction herein shown to assure that the rear portion of the trailer is not lowered relative to the rear wheels due to some mechanical failure of the power means 39.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A boat trailer adapted to be raised and lowered including in combination a T-shaped frame having a longitudinal member and a transverse member, hinge means dividing said longitudinal member into front and rear portions, latch means between said front and rear portions for selectively permitting and prohibiting movement of said portions about said hinge means, means at said front portion of said longitudinal member for securing said frame to a vehicle, an arm fixedly secured to said front portion and extending downwardly therefrom, power means mounted on said rear portion, a drive member connected to and driven by said power means between first and second positions to raise and lower said trailer, said drive member having first and second end portions, a connecting link having first and second end portions, pivot means connecting said first end portion of said connecting link to said arm, sliding pivot means connecting said second end portion of said connecting link to said first end portion of said drive member, first and second wheel assemblies, each said wheel assembly including a lever member having first and second end portions, a wheel and axle carried by said first end portion of each said lever member, pivot means pivotally connecting said lever members intermediate said first and second end portions thereof to respective end portions of said transverse member, first and second drive links pivotally connected at one end portion thereof to said second end portion of said drive member and pivotally connected at the other end portion thereof to said second end portion of said lever member of said respective first and second wheel assemblies.

2. A trailer adapted to be raised and lowered including in combination a frame, hinge means dividing said frame into front and rear portions, latch means between said front and rear frame portions for selectively permitting and prohibiting movement of said portions about said hinge means, means at said front frame portion for securing said frame to a vehicle, an arm fixedly secured to said front frame portion, power means mounted on said frame, a drive member connected to and driven by said power means between first and second positions to raise and lower said trailer, said drive member having first and second end portions, a connecting link having first and second end portions, pivot means connecting said first end portion of said connecting link to said arm, sliding pivot means connecting said second end portion of said connecting link to said first end portion of said drive member, first and second wheel assemblies, each said wheel assembly including a lever member having first and second end portions, a wheel and axle carried by said first end portion of each said lever member, pivot means pivotally connecting said lever members intermediate said first and second end portions thereof to said rear frame portion, first and second drive links pivotally connected at one end portion thereof to said second end portion of said drive member and pivotally connected at the other end portion thereof to said second end portion of said lever member of said respective first and second wheel assemblies.

3. A trailer adapted to be raised and lowered including in combination a frame, hinge means dividing said frame into first and second portions, means between said first and second frame portions for selectively permitting and prohibiting movement of said portions about said hinge means, means for securing said frame to a vehicle, an arm secured to said first frame portion, power means mounted on said second frame portion, a drive member connected to and driven by said power means between first and second positions to raise and lower said trailer, said drive member having first and second portions, a connecting link having raised and lowered end portions, means connecting said first end portion of said connecting link to said arm, means connecting said second end portion of said connecting link to said first portion of said drive member, first and second wheel assemblies, each said wheel assembly including a lever member having first and second end portions, a wheel and axle carried by said first end portion of each said lever member, pivot means pivotally connecting said lever members to said second frame portion, and connection means between said second portion of said drive member and said second portion of said lever member of said respective first and second wheel assemblies.

4. A trailer adapted to be raised and lowered including in combination a frame, hinge means dividing said frame into front and rear portions, latch means for preventing movement between said front and rear portions about said hinge means, means on said front portion for attaching said trailer to a vehicle, first and second wheel mounting members, pivot means pivotally mounting said first and second wheel mounting members to said rear portion of said frame, a wheel rotatively mounted by each said first and second wheel mounting members a distance from said pivot means, a drive member, power means for moving said drive member between first and second positions to raise and lower said trailer, first and second connecting links connecting one end portion of said drive member to said first and second wheel mounting members respectively, a third connecting link, pivot means connecting one end portion of said third connecting link to said front frame portion, and sliding pivot means connecting the other end portion of said third connecting link to the other end portion of said drive member.

5. A trailer including in combination a frame, hinge means dividing said frame into front and rear portions, latch means for preventing movement between said front and rear portions about said hinge means, means on said front portion for attaching said trailer to a vehicle, first and second wheel mounting members, pivot means pivotally mounting said first and second wheel mounting members to said rear portion of said frame, a wheel rotatively mounted by each said first and second wheel mounting members a distance from said pivot means, a drive member, power means for moving said drive member between raised and lowered positions, first and second connecting links connecting one end portion of said drive member to said first and second wheel mounting members respectively, a third connecting link, pivot means connecting one end portion of said third connecting link to said front frame portion, and connecting the other end portion of said third connecting link to the other end portion of said drive member.

References Cited in the file of this patent

UNITED STATES PATENTS

| | | |
|---|---|---|
| 2,502,309 | Byrd | Mar. 28, 1950 |
| 2,744,643 | Hipp | May 8, 1956 |
| 2,780,475 | Koerner | Feb. 5, 1957 |
| 2,788,908 | Lynd | Apr. 16, 1957 |
| 2,953,266 | Anderson | Sept. 20, 1960 |